United States Patent
Konchin et al.

(10) Patent No.: US 6,335,690 B1
(45) Date of Patent: *Jan. 1, 2002

(54) FLUID SENSING SYSTEM

(75) Inventors: Boris Konchin, Richmond Hill; Slavik Isakov, North York; Randy W. Corey, Bolton, all of (CA)

(73) Assignee: Algonquin Scientific, LLC, Troy, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/384,771

(22) Filed: Aug. 27, 1999

Related U.S. Application Data (63) Continuation-in-part of application No. 09/079,375, filed on May 15, 1998, which is a continuation-in-part of application No. 08/782,430, filed on Jan. 15, 1997, now Pat. No. 5,790,016.

(51) Int. Cl.[7] .............................................. G08B 21/00
(52) U.S. Cl. .................... 340/618; 340/450.2; 340/450; 340/620; 340/616; 340/623; 73/304 C
(58) Field of Search .............................. 340/618, 450.2, 340/450, 620, 616, 623; 73/304 C (56) References Cited

U.S. PATENT DOCUMENTS

| | | | |
|---|---|---|---|
| 3,602,884 A | 8/1971 | Brumbelow | 340/58 |
| 3,807,226 A | 4/1974 | Williams | 483/146 |
| 3,934,223 A | 1/1976 | Barabino | 152/418 |
| 4,067,376 A | 1/1978 | Barabino | 340/58 |
| 4,103,283 A | 7/1978 | Lee | 340/58 |
| 4,180,795 A | 12/1979 | Matsuda et al. | 340/58 |
| 4,334,428 A | 6/1982 | Fima et al. | 73/146.5 |
| 4,389,884 A | 6/1983 | Agulia | 73/146.5 |
| 4,392,382 A | 7/1983 | Myers | 73/708 |
| 4,588,978 A | 5/1986 | Allen | 340/58 |
| 4,695,823 A | 9/1987 | Vernon | 340/58 |
| 4,701,826 A | 10/1987 | Mikkor | 361/253 |
| 4,717,905 A | 1/1988 | Morrison, Jr. et al. | 340/58 |
| 4,814,744 A | 3/1989 | Collins | 340/443 |
| 5,006,844 A | 4/1991 | Ohta et al. | 340/448 |
| 5,035,137 A | 7/1991 | Burkard et al. | |
| 5,071,259 A | 12/1991 | Metzger et al. | 374/143 |

(List continued on next page.)

FOREIGN PATENT DOCUMENTS

| | | |
|---|---|---|
| DE | 873 213 | 4/1953 |
| EP | 0 202 375 A1 | 11/1986 |
| EP | 0 505 906 A1 | 9/1992 |
| GB | 1 528 505 | 8/1976 |
| GB | 2 058 420 A | 4/1981 |
| GB | 2172708 A | 9/1986 |
| GB | 2 337 335 A | 11/1999 |
| JP | 4-55739 | 5/1992 |
| WO | WO 94/20317 | 9/1994 |

*Primary Examiner*—Jeffery Hofsass
*Assistant Examiner*—Tai T. Nguyen
(74) *Attorney, Agent, or Firm*—Harness, Dickey & Pierce, PLC (57) ABSTRACT

A fluid sensing system for monitoring a fluid parameter within a fluid container includes a fluid sensor and a fluid receiver. The fluid sensor is positioned at a first location and is operable to sense the fluid parameter. The fluid receiver is positioned at a second location remote from the first location and within proximity to the fluid sensor. The fluid receiver includes an amplifier having a feedback path. The amplifier is in a waiting non-oscillating mode when the fluid sensor is not electromagnetically coupled to the fluid receiver and in an active oscillating mode when the fluid sensor is electromagnetically coupled to the fluid receiver, such that feedback in the feedback path is one of either a substantially zero feedback and a negative feedback when the amplifier is a waiting non-oscillating mode and said feedback path is a positive feedback when said amplifier is in an active oscillating mode. This fluid sensing system is capable of monitoring various fluid parameters such as fluid level and fluid type within the fluid container.

23 Claims, 6 Drawing Sheets

U.S. PATENT DOCUMENTS

| | | | |
|---|---|---|---|
| 5,083,457 A | 1/1992 | Schultz | 73/146.5 |
| 5,181,423 A | 1/1993 | Philipps et al. | 73/724 |
| 5,196,845 A | 3/1993 | Myatt | 340/870.31 |
| 5,218,861 A | 6/1993 | Brown et al. | 73/146.5 |
| 5,274,355 A | 12/1993 | Galan | 340/445 |
| 5,473,938 A | 12/1995 | Handfield et al. | 73/146.5 |
| 5,663,506 A | 9/1997 | Moore et al. | |
| 5,790,016 A | 8/1998 | Konchin et al. | 340/448 |

FLUID SENSING SYSTEM

CROSS REFERENCE TO RELATED APPLICATION

This application is a continuation-in-part application of U.S. Ser. No. 09/079,375, entitled "TIRE PRESSURE SENSING SYSTEM," filed May 15, 1998, which is now pending, which is a continuation-in-part application of U.S. Ser. No. 08/782,430, entitled "TIRE PRESSURE SENSING SYSTEM," filed Jan. 15, 1997, now U.S. Pat. No. 5,790,016.

BACKGROUND OF THE INVENTION

1. Field of the Invention

This invention relates generally to sensing systems and, more particularly, to a system that senses fluid type and fluid level in a fuel tank of a motor vehicle so as to provide signals indicative of the type of fuel being used and the vehicle fuel level.

2. Discussion of the Related Art

Conventional motor vehicles have generally utilized steel fuel tanks in the fuel system. However, automotive manufacturers have recently began to convert to plastic or polymer type fuel tanks to achieve weight reduction and cost savings. This change in material also provides a convenant medium in which electromagnetic communications from within the fuel tank to outside the fuel tank may be passed. Yet, existing fuel level indicators still employ mechanical floats and powered sensors that require access through the wall of the fuel tank.

With the increased concerns in hydrocarbon emissions from motor vehicles, there has also recently been an increased emphasis placed upon trying to reduce these hydrocarbon emissions which are generally regulated by governmental concerns. Some of the factors taken into consideration to reduce these hydrocarbon emissions is to reduce or eliminate any vapor leakage of fuel throughout the fuel delivery system. In this regard, any time an access port or bore needs to be formed within a wall of a fuel tank, this is a possible area for vapor and fuel leakage. Therefore, should it be possible to reduce or eliminate the number of input and output ports that must run within a fuel tank, a reduction in fuel vapor and leakage is possible.

What is needed then is a fluid type and fluid level sensing system that provides accurate fluid type and level indications that does not suffer from the above-mentioned disadvantages. This, in turn, will reduce or eliminate the number of ports passing through the wall of a fuel tank, reduce or eliminate hydrocarbon emissions based on fuel vapors leaking through these passageways or ports, provide an accurate and cost effective fluid type and fluid level indicator, and reduce the overall fuel tank assembly cost and complexity. It is, therefore, an object of the present invention to provide such a fluid type and fluid level sensing system for use in a fuel tank of a motor vehicle or for any other type of fluid retaining vessel.

SUMMARY OF THE INVENTION

In accordance with the teachings of the present invention, a fluid sensing system for sensing various parameters of fluid in a fluid container is disclosed. This is basically achieved by using a fluid sensor and a fluid receiver which are each positioned remote therefrom and in electromagnetic communication with each other.

In one preferred embodiment, a fluid sensing system for determining a fluid parameter within a fluid container includes a fluid sensor and a fluid receiver. The fluid sensor is positioned at a first location and is operable to sense the fluid parameter. The fluid receiver is positioned at a second location remote from the first location and within proximity to the fluid sensor. The fluid receiver includes an amplifier having a feedback path such that the amplifier is in a waiting non-oscillating mode when the fluid sensor is not electromagnetically coupled to the fluid receiver and in an active oscillating mode when the fluid sensor is electromagnetically coupled to the fluid receiver. This provides a feedback in the feedback path that is one of either a substantially zero feedback and a negative feedback when the amplifier is in the waiting, non-oscillating mode and a feedback in the feedback path that is a positive feedback when the amplifier is in the active oscillating mode.

Use of the present invention provides a fluid sensing system for sensing a fluid parameter within a fluid container. As a result, the aforementioned disadvantages associated with the currently available fluid sensing systems have been substantially reduced or eliminated.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENT(S)

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the present invention as defined in the following claims. Moreover, it should be noted that while the present invention is discussed in detail with reference to a fuel tank used in a fuel system of a motor vehicle, the fluid type and level sensing system according to the teachings of the present invention may be employed with any type of fluid or fluid container or monitor any fluid parameter.

Figure 1:
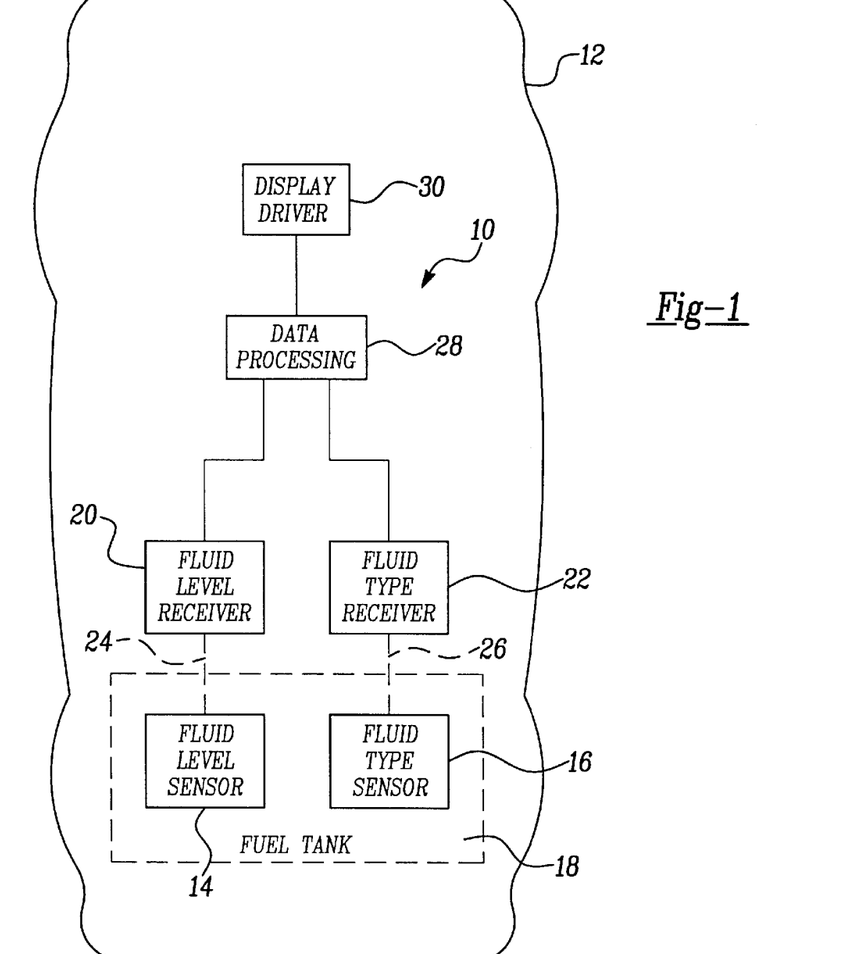
FIG. 1 is a schematic block diagram of the fluid type and level sensing system according to the teachings of the preferred embodiment of the present invention.

A fluid type and level sensing system 10 according to the teachings of the preferred embodiment of the present invention is shown in association with a motor vehicle 12 in FIG. 1. The fluid type and level sensing system 10 utilizes the technology set forth in U.S. Pat. No. 5,790,016, as well as that disclosed in U.S. Ser. No. 09/079,375 which are each hereby incorporated by reference. The fluid sensing system 10 includes a first passive fluid level sensor 14 and a second passive fluid type sensor 16 disposed within a fuel tank 18. Preferably, the fluid level sensor 14 is positioned on a side wall or at an appropriate location within the fuel tank 18 to provide an accurate fuel level indication. The fluid type sensor 16 is preferably positioned at the base or the lower most portion of the fuel tank 18 so that the fluid type sensor 16 is preferably always submerged within the fuel stored within the fuel tank 18.

The fuel tank 18 is preferably formed from plastic, fiberglass or other material which enables propagation of electromagnetic waves through the fuel tank 18 to enable the passive sensors 14 and 16 to communicate to a fluid level receiver 20 and a fluid type receiver 22, respectively. In this regard, the fluid level sensor 14 communicates with the fluid level receiver 20, via wireless electromagnetic coupling channel 24, and fluid type sensor 16 communicates with fluid type receiver 22, via wireless electromagnetic coupling channel 26.

Each remotely mounted receiver 20 and 22 is preferably positioned at no more than about 35 millimeters from each of its respective sensors 14 and 16 based upon the passive sensor configuration. Should active or powered sensors be utilized, the distance of the receivers 20 and 22 relative to the sensors 14 and 16 can be increased significantly. Here again, the sensor and receiver technology is preferably similar to that disclosed in U.S. Pat. No. 5,790,016 and U.S. Ser. No. 09/079,375, which are each hereby incorporated hereby reference.

It should further be noted that since the electromagnetic coupling channels 24 and 26 operate at very low frequencies (VLF), this electromagnetic coupling may propagate through the fuel tank 18 with little interference. In this regard, the signal transmission capability is not diminished or effected by the medium being transmitted through since the information being provided is frequency based (i.e. each sensors resonant frequency) and not amplitude based. Therefore, the strength or weakness of the signals do not distort the information on the channels 24 and 26. The passive sensor configuration also eliminates the need for having data channels or power lines running through the walls of the fuel tank 18 to the sensors 14 and 16. By eliminating the ports in the fuel tank 18, the opportunity for fuel leakage or vapor escape is reduced, along with reduced hydrocarbon emissions from the fuel tank 18.

The data or information regarding the fluid level and the fluid type that is transmitted from the fluid level sensor 14 to the receiver 20 and the fluid type sensor 16 to the receiver 22 are subsequently transmitted to a data processing circuit 28 for processing and then to a display driver 30. The display driver 30 provides an indication of the amount of fuel in the fuel tank 18, as well as optionally providing an indication of the type of fuel in the fuel tank 18. This fluid type information may also be forwarded to an on-board engine controller (not shown) which may use this information for appropriate engine control purposes. Additionally, the fluid type information is used to insure an accurate fuel level reading, further discussed herein.

Figure 2:
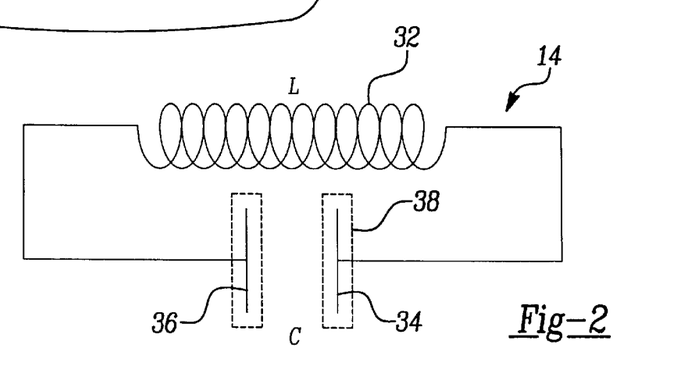
FIG. 2 is a schematic diagram of the passive sensor employed in the fluid type and level sensing system, shown in FIG. 1.

The fluid level sensor 14, is shown schematically in FIG. 2 and includes an inductor 32 and a capacitor 34 in an electrically closed loop. The fluid level sensor 14 is a passive circuit with no internal power provided to the circuit. However, if a power source is provided, the coupling range of the fluid level sensor 14 with the fluid level receiver 20 can be extended or the coil size of the inductor 32 can be reduced. It should be understood that the fluid type sensor 16 is substantially similar to the fluid level sensor 14, as disclosed herein.

The capacitor 34 can be generally described as an electric field storage tank, while the inductor 32 can generally be described as a magnetic field storage tank. The energy in these tanks oscillates between these two devices at a resonant frequency defined by the equation:

$$F_{Resonant}=1/(2\pi\sqrt{LC})$$

where;
F=Frequency (Hz.),
L=Inductance (H), and
C=Capacitance (F).

Since the sensor 14 oscillates at a frequency proportional to the value of the inductance and the capacitance of the circuit shown in FIG. 2, modifying either of these parameters will directly change the resonant frequency and therefore, provide a basis for the frequency modulated or FM communication channels 24 and 26.

This change in resonant frequency of the sensor 14 and 16 is detected by each receiver 20 and 22. In this regard, each receiver 20 and 22 are constructed with at least two inductor coils and an amplifier circuit, further discussed herein. With the appropriate application selected, the inductor coils are constructed, positioned relative to one another, and wound in such a manner as to balance the magnetic linkage or mutual inductance between the inductive coils in the receiver, such that the feedback between these coils is one of either a substantially zero feedback or a negative feedback so as not to generate an input voltage to the amplifier circuit. In other words, with the sensor 14 not positioned in operative proximity to the receiver 20, the receiver 20 is in a non-oscillating mode where the feedback in the amplifier is one of either substantially zero or negative feedback. With the sensor 18 positioned in operative proximity to the receiver 20, the receiver 20 is in an oscillating mode where the feedback in the amplifier is positive.

The two inductor coils in the receiver 20 consist of an input coil connected directly to the input of the amplifier circuit and an output coil which is connected to the amplifier output and provided with a DC power to generate a magnetic field. This magnetic field interacts with the field generated by the inductor 32 in the sensor 14 located within the fuel tank 18. The oscillating field created by the LC circuit formed by the sensor 14 interacts with the receiver's output coil magnetic field to create a change in the output coil's field, thereby inducing a small voltage in the receiver's input coil. This input voltage is amplified by the amplifier circuit and returned, via the feedback in the amplifier, as well as supplied to the output coil, thereby increasing the output coil's magnetic field to induce a larger voltage at the input coil. This positive feedback cycle continues and creates an output signal at the same frequency as the resonant frequency of the sensor 14 (i.e., $F_{Resonant}=1/(2\pi\sqrt{LC})$.

The value of the capacitance between the parallel plates 36 in the capacitor 34 is dependent upon the gap, surface area, and the dielectric constant of the material between the plates 36. The governing relationship for the value of the capacitance is defined as follows:

$$C\|_{Plate} = (K\epsilon_0 A)/d$$

where;

C=capacitance (F),
K=Dielectric Constant of material,
$\epsilon_0$=Permitivity Constant (8.85E-12 F/m),
A=Surface Area of Plates, and
d=Gap between Parallel Plates.

Based upon this equation, it can readily be observed that should the surface area of the plates 36 and the gap between the plates 36 remain constant, change in the dielectric constant K will control the value of the capacitance in the capacitor 34 within the sensor 14. This change in the dielectric constant K will control the resonant frequency of the sensor 14 (i.e., $F_{Resonant}=1/(2\pi\sqrt{LC})$. Accordingly, by positioning the fluid level sensor 14 appropriately within the fuel tank 18 whereby the parallel plates 36 of the capacitor 34 are positioned vertical relative to the fluid level, the resonant frequency of the sensor 14 will vary as the fluid level varies within the fuel tank 18.

In this regard, the dielectric constant K of air is about 1.00, while the dielectric constant of gasoline is about 1.92 to about 2.0. The level of fuel in the fuel tank 18 will therefore determine the value of the capacitance and the resultant resonant frequency. For example, if the fuel tank 18 is substantially empty, only air/fuel vapor exists in the fuel tank 18 and the capacitance of the capacitor 34 is approximated by:

$$C\|_{Air} = (K_{Air}\epsilon_0 A)/d$$
$$= (\epsilon_0 A)/d$$

With the fuel tank 18 full of fuel, the capacitance is approximated by:

$$C\|_{Gasoline} = (K_{Gasoline}\epsilon_0 A)/d$$
$$= 2(\epsilon_0 A)/d$$

One can observe upon review of these equations that as long as there are two mediums used (i.e. air and fuel) which do not have the same dielectric constant, an analog output can be achieved based on the varying resonant frequency of the level sensor 14.

Figure 3A:
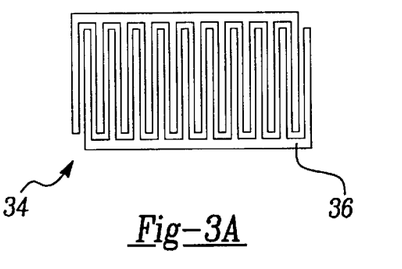
FIGS. 3A and 3B are examples of two types of capacitors utilized in the sensor of FIG. 2.
Figure 3B:
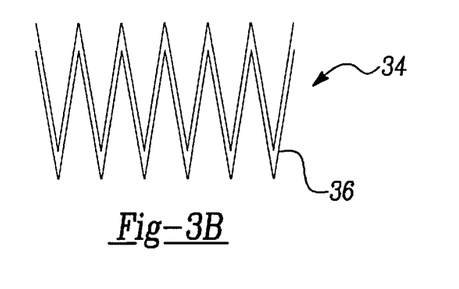

The construction of the capacitor 34 is preferably from low cost materials which may include an extruded capacitator formed from a plurality of extruded parallel plates 36, shown in FIG. 3A or a stamped capacitator 34 having stamped or cut-out parallel plates 36, as shown in FIG. 3B. To reduce the chance for a short circuit between the parallel plates 36, each parallel plate 36 may be isolated from one another utilizing a insulating material surrounded at least one or both of the parallel plates 36, identified by reference numeral 38 in FIG. 2. This insulation may be a conventional laminate or other type of insulating material which enables a capacitative charge to be formed between the parallel plates 36, while eliminating a short circuit between the plates 36. In general, the insulating layer 38 is used when the medium between the plates 36 is highly electrically conductive, such as in the case of gasoline type fuels.

Figure 4A:
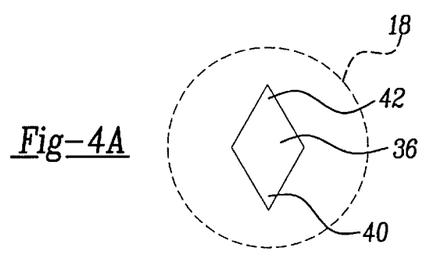
FIGS. 4A–4C are diagrams of capacitor plates having various shaped geometries for use in the sensor of FIG. 2.
Figure 5A:
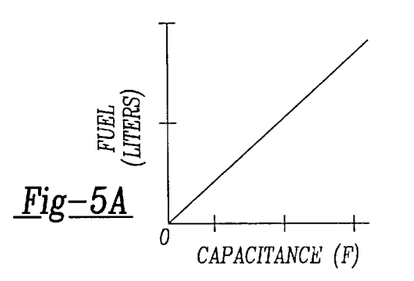
FIGS. 5A–5C are graphs illustrating the resolution of the capacitor plates of FIG. 4A–AC.

The shape of the capacitor plates 36 may also be configured in a geometry that corresponds to the shape of the fuel tank 18 to provide a substantially linear output to identify the fluid level. For example, FIG. 4A shows a fuel tank 18 which is substantially cylindrical and a parallel plate 36 having a geometry similar to a diamond shape. This configuration essentially takes a non-linear volume within the fuel tank 18 and provides a linear output based upon the geometry of the parallel plate 36 within the capacitator 34. Specifically, a first end 40 of the parallel plate 36 has a smaller surface area and thereby provides a smaller capacitative change. By positioning this first end 40 near the arcuate or bottom portion of the tank 18 which has a smaller volume then the mid-region of the tank 18, which requires higher resolution to identify level changes, this provides a substantially linear output from a substantially empty fuel tank to substantially half full. Additionally, by positioning the second smaller end 42 near the top of the fuel tank 18, where there is also less fuel based on the shape of the fuel tank 18, resolution or change is less in this area to provide a substantially linear output from half-full to full. This resolution is illustrated by the graph in FIG. 5A, which shows the fuel level (in liters) versus the capacitance (in farrads) is linear simply by shaping the capacitative plate 36 appropriately for the geometry of the fuel tank 18.

Figure 4B:
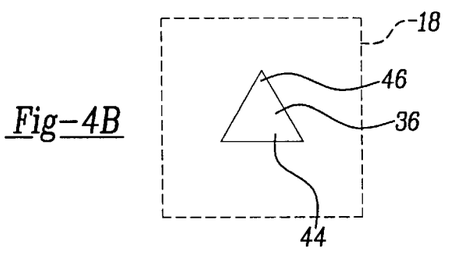
Figure 4C:
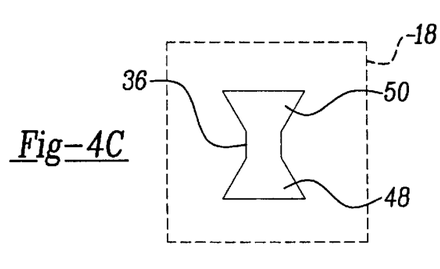
Figure 5B:
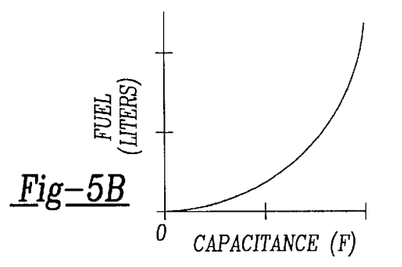
Figure 5C:
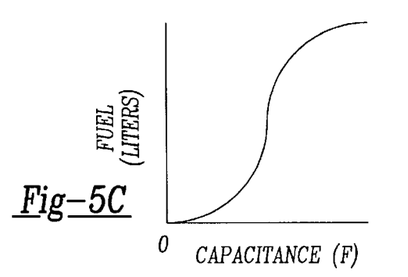

Should it be desired to provide a higher resolution when the fuel level is lower in the fuel tank 18, a configuration as shown in FIG. 4B may be used. In this regard, the fuel tank 18 has a uniform shape while the capacitative plate 36 has a triangular shape to provide higher resolution at a first end 44 versus a second end 46. This output is shown in the graph on FIG. 5B. Should a higher resolution be desired when the fuel tank is substantially full or when it is substantially empty, a geometric configuration of the capacitative plate 36 may be formed relative to the fuel tank 18, as shown in FIG. 4C. The responsiveness or regulation of this dumbbell shape having a first end 48 and a second end 50 is shown in FIG. 5C where the resolution is higher at both the lower end and higher end of the fuel gauge.

Figure 6A:
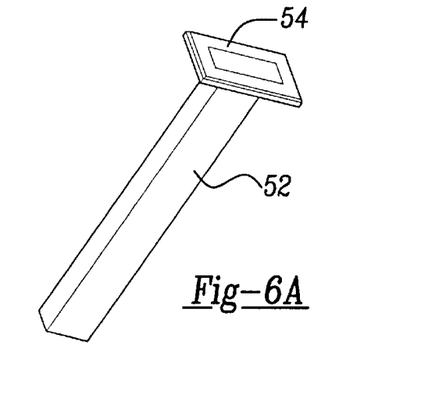
FIGS. 6A–6D are perspective views of assembled sensor configurations of FIG. 2.
Figure 6B:
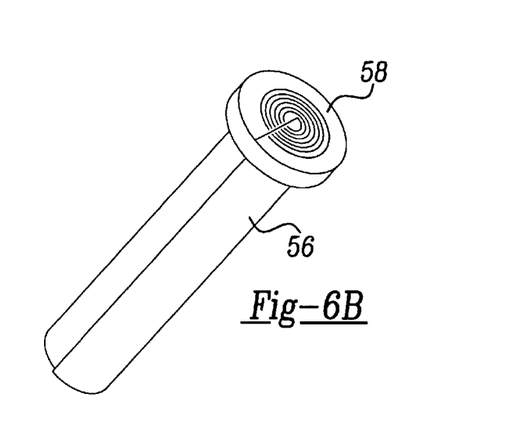

The inductor coil 32 in the sensor 14 may be constructed either by winding a conventional bobbin or by creating the coils in a multi-layered printed circuit board (PCB). Different sensor configurations are shown in FIGS. 6A–6D. In FIG. 6A, an extruded capacitator 52 along with a PCB inductor 54 is shown forming the sensor assembly 14. The extruded capacitator 52 is electrically coupled to the PCB conductor 54 and further includes endcaps (not shown) which maintain separation of the parallel plates 36 in the extruded capacitator 52. An alternate embodiment for the sensor 14 is shown in FIG. 6B which includes a rolled cylindrical capacitator 56 and a bobbin rolled inductor 58. Here again, endcaps maintain the separation of the parallel plates in the rolled cylindrical capacitator 56. It should again be understood that while different embodiments of the sensor 14 are shown for the fluid level sensor 14, the fluid type sensor 16 will also be substantially similar to the fluid level sensor 14 and may be formed by the embodiments disclosed herein or other appropriate embodiments.

Figures 6C, 6D:
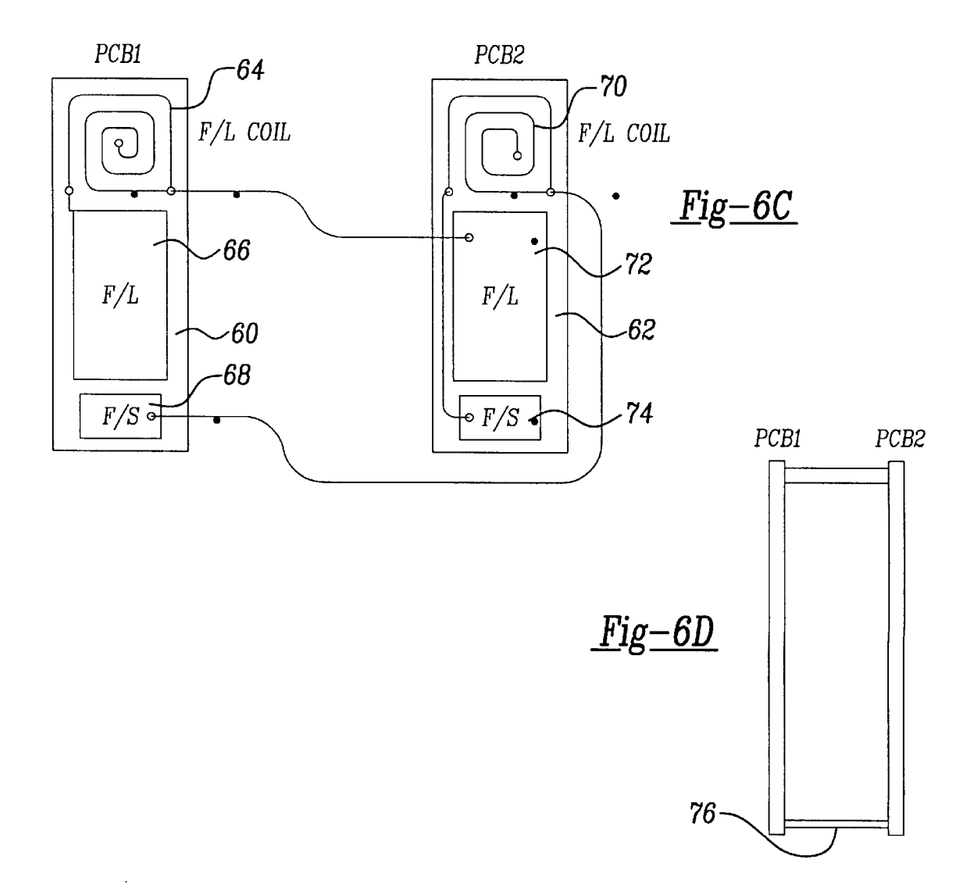

Should it be desired to combine the fluid level sensor 14 and the fluid type sensor 16, an assembly as shown in FIG. 6C–6D may be utilized. In this regard, the assembly in FIG. 6C includes a first printed circuit board 60 and a second printed circuit board 62. The first printed circuit board 60 will include an inductor 64 formed from the printed circuit board traces and a capacitative plate 66 used for the fluid level sensor 14 and a capacitative plate 68 used for the fluid type sensor 16. The printed circuit board 62 will also include a coil 70, a fluid level capacitative plate 72 and a fluid type capacitative plate 74. The fluid level sensor 14 will be formed from the capacitor formed by capacitative plates 66 and 72 along with coil 64, while the fluid type sensor 16 will be formed from the coil 70 and capacitative plates 68 and 74. Each printed circuit board 60 and 62 will be offset from one another as shown in FIG. 6D, via offsets 76 such that the fluid type capacitative plates 68 and 74 are located at the bottom portion of the fuel tank 18 so that they are always positioned within the fuel and the fluid level capacitator plates 66 and 72 are positioned vertical relative to the fuel tank 18 to provide for the fluid level indication. When using this type of assembly, either both individual receivers 20 and 22 may be utilized adjacent to this assembly or a single receiver may be utilized adjacent the assembly which will receive both waveforms super-imposed upon one another and detected by the single receiver utilized.

Figure 7:
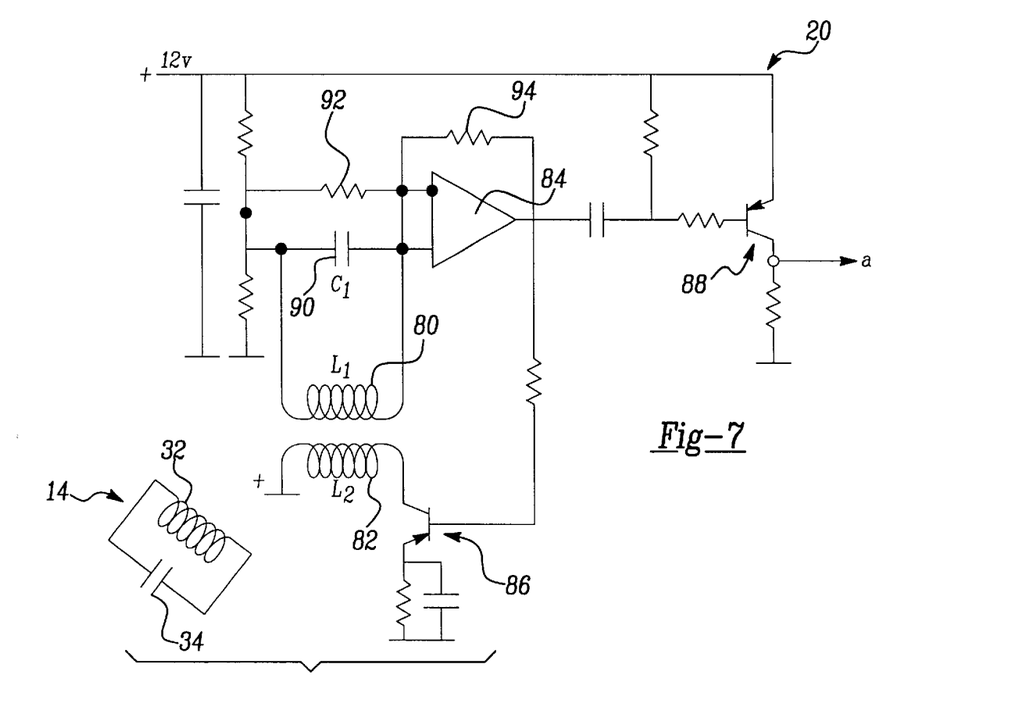
FIG. 7 is a detailed schematic block diagram of the sensor and receiver shown in FIG. 1.

Turning now to FIG. 7, a schematic diagram of the level sensor 14 positioned in operative proximity to the receiver 20 is shown in further detail. Here again, it should be understood that the receiver 22 is substantially similar to the receiver 20. The fluid level sensor 14 includes the inductor 32 and the capacitator 34 having one of the configurations as previously disclosed. The receiver 20 includes an input inductor or coil 80, an output inductor or coil 82, an amplifier 84, a transistor 86 operated as a linear amplifier and a switching transistor 88. The input inductor 80 is positioned in parallel with an input capacitor 90 to form an input contour calibrated for greater sensitivity to the resonant frequency of the sensor 14 located within the fuel tank 18. The operational amplifier 84 is used for signal amplification and has a gain calibrated by the resistors 92 and 94 which form the feedback loop into the amplifier 84. Further current amplification is performed by the transistor 86 for additional amplification that is required to obtain total gain of the receiver 20.

In particular, the output signal taken from the switching transistor 88 at point "a" can be adjusted to have a zero output when the mutual displacement of the coils L1 and L2 is said to have a zero or negative feedback and the sensor 14 is not in operative proximity to the receiver 20. By displacing these coils L1 and L2 in either direction from each other, either negative or positive feedback can be achieved. In the case of positive feedback, an output from the receiver 20 will be present at output "a" in transistor 88. In the case of a negative or a substantial zero feedback, the output at point "a" in the transistor 88 is equal to about zero. In general, the output from the operational amplifier 84 is greater than "1" when the following condition is met:

$$K\beta > 1,$$

where $K = K_1 \times K_2$
$K_1$ = gain of operational amplifier 84,
$K_2$ = the gain of transistor 86, and
$\beta$ = mutual coefficient of inductors 80,82.

The variable $\beta$ depends on the displacement of the inductors 80 and 82, number of turns and their shape (size). For a final adjustment when K is constant, $\beta$ is adjusted in such a way that $K\beta \leq 1$ by adjusting the mutual displacement of the inductors $L_1$ and $L_2$. Also, the switching transistor 88 operates as pulse detector for the operational amplifier 84 while the other components shown are required for DC calibration of the circuit.

In operation, when the sensor 14 is positioned in operative proximity to the input inductor 80 and the output inductor 82, mutual coupling between these inductors occurs. In this regard, inductor 32 will cause the inductor 82 to begin oscillation when placed in proximity therewith. This oscillation will also cause the inductor 80 to begin oscillating due to the mutual coupling between inductors 80 and 82. With this input voltage appearing at the operational amplifier 84, this increases the output from the operational amplifier 84 to provide further power to the inductor 82, via the amplifying transistor 86. This again creates further coupling between the inductors 82 and 80 thereby increasing further input into the amplifier 84 with a further amplified output. When this occurs, the feedback in the amplifier 84 changes from a substantially zero or negative feedback to a positive feedback, thereby providing a pulse output via transistor 88 at output "a", shown clearly in FIG. 10 as waveform 110.

Figures 8A, 8B:
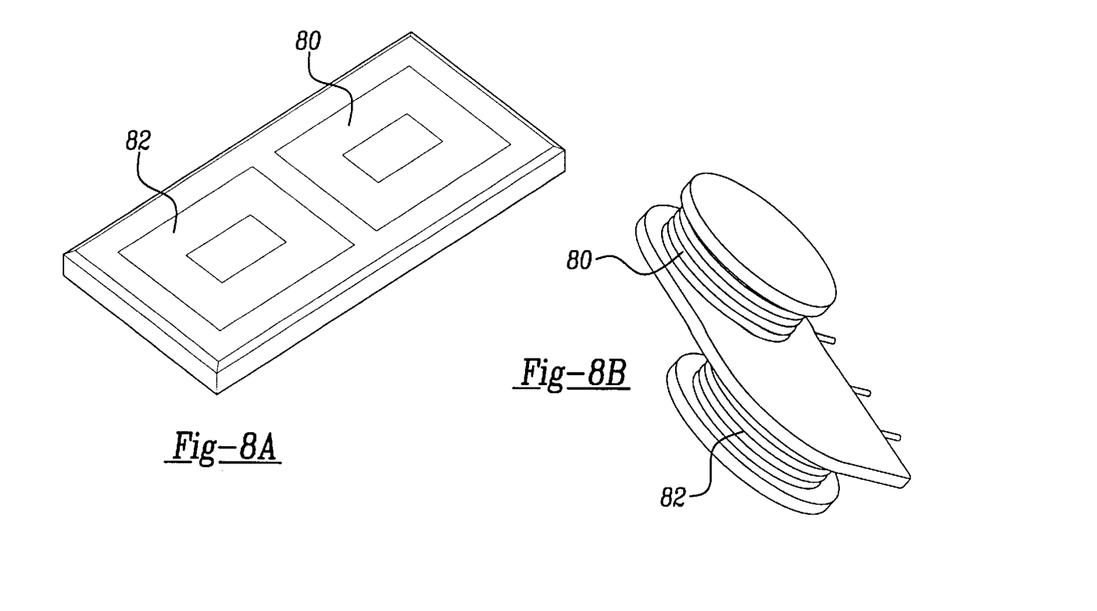
FIGS. 8A–8B are two different embodiments of inductor configurations used in the receiver of FIG. 7.

The inductors 80 and 82 within the receiver 20 may be formed either from a multi-layered printed circuit board construction, as shown in FIG. 8A, or may be formed from a custom bobbin, as shown in FIG. 8B. These constructions provide the appropriate spacing of the inductor 80 relative to inductor 82 such that when the sensor 14 is not in operative proximity to the receiver 20, feedback in the operational amplifier 84 is substantially zero or negative.

Figure 9:
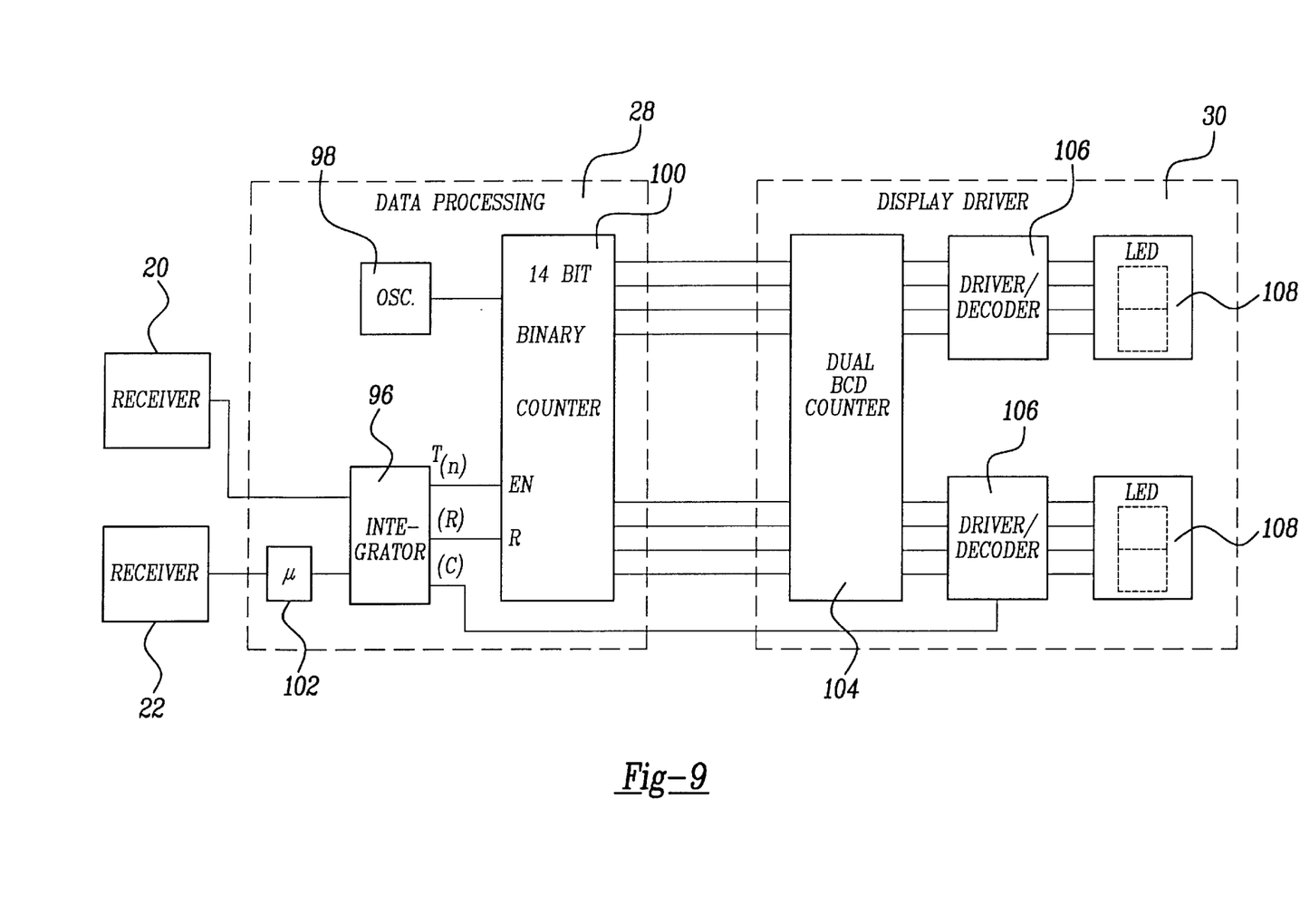
FIG. 9 is a detailed schematic block diagram of the data processing and display driver shown in FIG. 1.

Referring now to FIG. 9, the data processing circuit 28 and the display driver circuit 30 are shown schematically in further detail. The data processing circuit 28 includes an integrator 96, a crystal oscillator 98, a 14 bit binary counter 100 and a microprocessor 102. The display driver circuit 30 includes a dual binary coded decimal (BCD) counter 104, a pair of decoder drivers 106 and a pair of LEDs 108.

Figure 10:
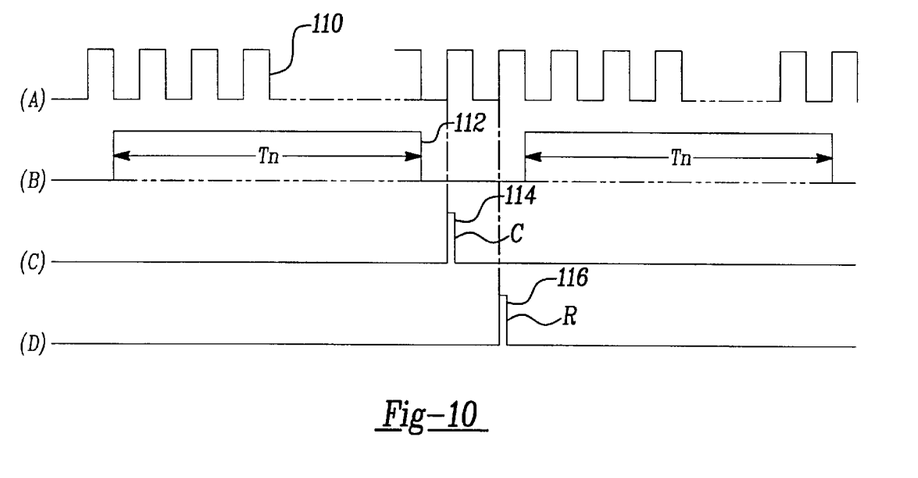
FIG. 10 is a timing diagram for the operation of the fluid type and level sensing system shown in FIG. 1.

In operation, the fluid level receiver 20 provides a pulsed output such that the frequency varies with the capacitance value of the capacitor 34 depending upon the fluid level or the dielectric change. This pulse output is shown in FIG. 10 as waveform 110. The pulse output is applied to the integrator 96 which integrates over a specific number (n) of pulses 110 being supplied by the receiver 20. For example, should the integrator 96 have a number n equaling 20, the integrator 96 will count 20 pulses and provide an output pulse $T_n$ corresponding to the length or period it takes for 20 pulses to appear, as shown by waveform 112. As the frequency of the waveform 110 changes, the period of the waveform 112 will vary.

This waveform 112 is fed to an enable port of the 14 bit binary counter 100 which enables this counter 100 to count over the period $T_n$, the pulses being supplied by the crystal oscillator 98. This count will accordingly vary as the frequency of the waveform 110 varies. This 14 bit binary number is then forwarded from the 14 bit binary counter 100 to the dual binary coded decimal counter 104 to supply the driver decoders 106 with the appropriate binary coded decimal number to drive the LEDs 108. After a pulse $T_n$ occurs, the next pulse in the waveform 110 triggers a clear or refresh pulse C, as shown as 114 in FIG. 10, which is delivered to the decoder drivers 106 to refresh the output display of the LEDs 108. The next pulse in the waveform 110, identified as 116 in FIG. 5, and noted as R, resets the 14 bit binary counter 100 and the process begins again.

To insure an accurate fuel level reading, the type of fuel must be taken into consideration since its dielectric constant K will change. To do this, the integrator 96 will vary the number of pulses n it counts so that the level indicator is linear irrespective of the type of fuel or change in dielectric constant in the fuel tank 18. In this regard, the fluid type receiver 22 is in communication with a microprocessor 102 which determines the type of fluid based on determining the dielectric value. This may be done by comparing the capacitance value in a look-up table to determine the fluid type. In this regard, assuming that the capacitative plates of the sensor 16 are always covered in fluid, the only variable is the dielectric constant. By knowing all the variables for the capacitance of a parallel plate, the microprocessor 102 can determine the type of fuel used and thereby change the number n for the integrator 96 to provide a substantially linear output irrespective of the dielectric presented to the fluid level sensor 14.

Figure 11:
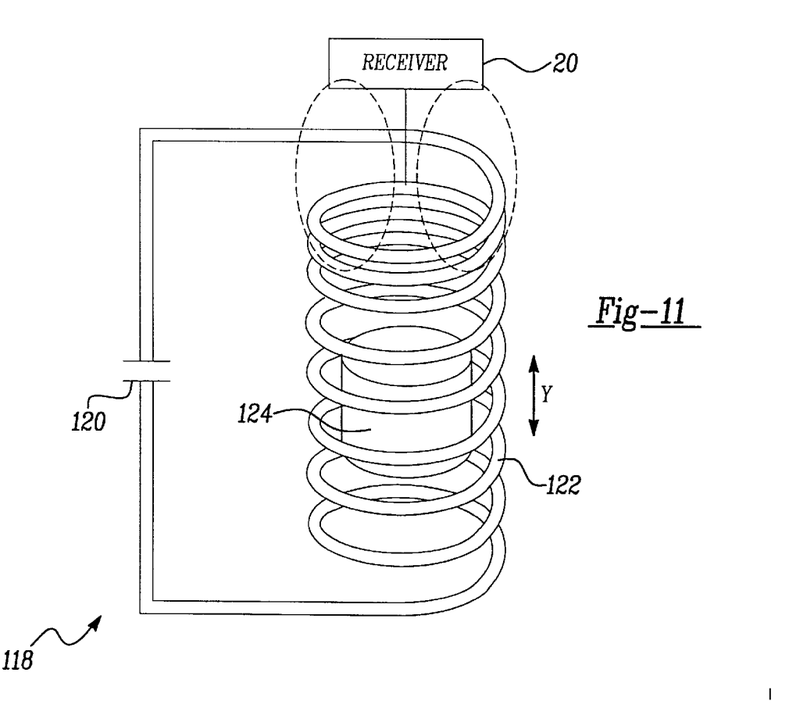
FIG. 11 is an alternate embodiment of a sensor employed in the fluid type and level sensing system shown in FIG. 1.

Finally, referring to FIG. 11, an alternate sensor 118 is shown which includes a fixed capacitance 120 and a variable inductor 122 that varies with the varying fluid level in the fuel tank 18. In this regard, the inductor 122 is a substantially coiled or cylindrical inductor that includes a ferrite plunger 124 positioned within the core area of the inductor 122. This ferrite plunger 124 will float in the fuel tank 18 relative to the inductor 122 thereby changing the inductance and the resulting resonant frequency of the sensor 14. The inductor 122 further includes increased winding at its distal end to provide increased coupling of the electromagnetic field of the sensor 14 relative to the receiver 20. The ferrite influence on the inductor 122 is further discussed in detail in U.S. Ser. No. 09/079,375, which is hereby incorporated by reference.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention.

What is claimed is:

1. A fluid sensing system for determining a fluid level within a fluid container, said fluid sensing system comprising:
   a passive fluid level sensor positioned within the fluid container, said passive fluid level sensor operable to sense the fluid level within the fluid container;
   a fluid level receiver in operative proximity to said passive fluid level sensor, said fluid level receiver operable to generate a signal indicative of the fluid level sensed by the passive fluid level sensor, said fluid level receiver having an amplifier with a feedback path, said amplifier being in a waiting non-scillating mode when said fluid sensor is not electromagnetically coupled to said fluid receiver and being in an active oscillating mode when said fluid sensor is electromagnetically coupled to said fluid receiver, wherein said feedback in said feedback path is one of either a substantially zero feedback and a negative feedback when said amplifier is in said waiting non-oscillating mode and said feedback path is a positive feedback when said amplifier is in said active oscillating mode; and
   a fluid level indicator in communication with said fluid level receiver to provide a fluid level indication based on the signal generated by said fluid level receiver.

2. The sensing system as defined in claim 1, wherein said passive fluid level sensor includes a passive inductor/capacitor (LC) circuit.

3. The fluid sensing system as defined in claim 2, wherein a capacitance of said capacitor varies in proportion to the fluid level in the fluid container based upon a change in dielectric constant between parallel plates in said capacitor.

4. The fluid sensing system as defined in claim 3 wherein at least one of said parallel plates has an insulating layer to inhibit shorting between said parallel plates.

5. The fluid sensing system as defined in claim 3 wherein said parallel plates are geometrically configured to provide a substantially linear output relative to a shape of the fluid container.

6. The fluid sensing system as defined in claim 5 wherein said geometric shape is selected from the group consisting of a diamond shape, a triangle shape, and a barbell shape.

7. The fluid sensing system as defined in claim 3 wherein a communication channel between said passive fluid level sensor and said fluid level receiver is a wireless electromagnetic communication channel.

8. The fluid sensing system as defined in claim 1 further comprising a fluid type sensor operable to provide a signal indicative of a type of fluid in the fluid container based upon a change in the dielectric constant of the fluid.

9. The fluid sensing system as defined in claim 8 further comprising a fluid type receiver in operative proximity to said fluid type sensor, said fluid type receiver operable to generate a signal indicative of the fluid type.

10. A fluid sensing system for determining a fluid level within a fluid container, said fluid sensing system comprising:
   a passive fluid level sensor positioned within the fluid container, said passive fluid level sensor operable to sense the fluid level within the fluid container;
   a fluid level receiver in operative proximity to said passive fluid level sensor, said fluid level receiver operable to generate a signal indicative of the fluid level sensed by the passive fluid level sensor, said fluid level receiver includes a first inductor, a second inductor and an amplifier having a feedback path, said first inductor and said second inductor being positioned relative to one another so that upon creating an electromagnetic coupling between said first inductor and said second inductor when said passive fluid level sensor is not in operative proximity to said fluid level receiver, feedback from said coupling in said feedback path is one of either a substantially zero feedback and a negative feedback; and
   a fluid level indicator in communication with said fluid level receiver to provide a fluid level indication based on the signal generated by said fluid level receiver.

11. The fluid sensing system as defined in claim 10 wherein said feedback in said feedback path is a positive feedback when said fluid level sensor is in operative proximity and electromagnetically coupled with said fluid level receiver.

12. A fluid sensing system for determining a fluid type within a fluid container, said fluid sensing system comprising:
   a fluid type sensor operable to provide a signal indicative of a type of fluid in the fluid container based upon a change in the dielectric constant of the fluid, and
   a fluid type receiver in operative proximity to said fluid type sensor, said fluid type receiver operable to generate a signal indicative of the fluid type, said fluid type receiver includes a first inductor, a second inductor and an amplifier having a feedback path, said first inductor and said second inductor being positioned relative to one another so that upon creating an electromagnetic coupling between said first inductor and said second inductor when said passive fluid type sensor is not in operative proximity to said fluid type receiver, feedback from said coupling in said feedback path is one of either a substantially zero feedback and a negative feedback.

13. A fluid sensing system for determining a fluid level and a fluid type within a fluid container, said fluid sensing system comprising:
   a passive fluid level sensor positioned within the fluid container, said passive fluid level sensor operable to sense the fluid level within the fluid container;
   a passive fluid type sensor positioned within the fluid container, said passive fluid type sensor operable to sense the type of fluid within the fluid container;

a fluid level receiver in operative proximity to said passive fluid level sensor, said fluid level receiver operable to generate a signal indicative of the fluid level in the fluid container, said fluid level receiver having an amplifier with a feedback path, said amplifier being in a waiting non-oscillating mode when said fluid sensor is not electromagnetically coupled to said fluid receiver and being in an active oscillating mode when said fluid sensor is electromagnetically coupled to said fluid receiver, wherein said feedback in said feedback path is one of either a substantially zero feedback and a negative feedback when said amplifier is in said waiting non-oscillating mode and said feedback path is a positive feedback when said amplifier is in said active oscillating mode;

a fluid type receiver in operative proximity to said passive fluid type sensor, said fluid type receiver operable to generate a signal indicative of the type of fluid in the fluid container; and a fluid level indicator in communication with said fluid level receiver to provide a fluid level indication based on the signal generated by said fluid level receiver and said fluid type receiver.

14. The fluid sensing system as defined in claim 13 wherein said passive fluid level sensor includes a passive inductor/capacitor (LC) circuit and said passive fluid type sensor includes a passive inductor/capacitor (LC) circuit.

15. The fluid sensing system as defined in claim 13 wherein said passive fluid level sensor is in communication with said fluid level receiver, via a wireless electromagnetic channel and said passive fluid type sensor is in communication with said fluid type receiver, via a wireless electromagnetic channel.

16. The fluid sensing system as defined in claim 13 wherein said passive fluid level sensor and said passive fluid type sensor are formed from a pair of printed circuit boards separated from one another.

17. A fluid sensing system for determining a fluid level and a fluid type within a fluid container, said fluid sensing system comprising:

a passive fluid level sensor positioned within the fluid container, said passive fluid level sensor operable to sense the fluid level within the fluid container;

a passive fluid type sensor positioned within the fluid container, said passive fluid type sensor operable to sense the type of fluid within the fluid container;

a fluid level receiver in operative proximity to said passive fluid level sensor, said fluid level receiver operable to generate a signal indicative of the fluid level in the fluid container, said fluid level receiver includes a first inductor, a second inductor and an amplifier having a feedback path, feedback in said feedback path being substantially positive when said passive fluid level sensor is positioned in operative proximity to said fluid level receiver;

a fluid type receiver in operative proximity to said passive fluid type sensor, said fluid type receiver operable to generate a signal indicative of the type of fluid in the fluid container; and a fluid level indicator in communication with said fluid level receiver to provide a fluid level indication based on the signal generated by said fluid level receiver and said fluid type receiver.

18. A fluid sensing system for sensing a fluid parameter within a fluid container, said fluid sensing system comprising:

a fluid sensor positioned at a first location relative to said fluid container, said fluid sensor operable to sense the fluid parameter, and a fluid receiver positioned at a second location remote from said first location and within proximity to said fluid sensor, said fluid receiver having an amplifier with a feedback path, said amplifier being in a waiting non-oscillating mode when said fluid sensor is not electromagnetically coupled to said fluid receiver and being in an active oscillating mode when said fluid sensor is electromagnetically coupled to said fluid receiver, wherein said feedback in said feedback path is one of either a substantially zero feedback and a negative feedback when said amplifier is in said waiting non-oscillating mode and said feedback path is a positive feedback when said amplifier is in said active oscillating mode.

19. The fluid sensing system as defined in claim 18 wherein said fluid parameter is selected from the group consisting of fluid level and fluid type.

20. The fluid sensing system as defined in claim 18 wherein said fluid receiver further includes an input inductor in communication with an input to said amplifier and an output inductor in communication with an output of said amplifier, said input and output inductors being electromagnetically coupled to said fluid sensor when said receiver is in said active oscillating mode.

21. The fluid sensing system as defined in claim 18 wherein said fluid sensor includes a passive inductor/capacitor (LC) circuit.

22. The fluid sensing system as defined in claim 21 wherein a capacitance of said capacitor varies and an inductance of said inductor is fixed.

23. The fluid sensing system as defined in claim 21 wherein a capacitance of said capacitor is fixed and an inductance of said inductor varies.

* * * * *